Aug. 1, 1944.　　　M. G. P. PESCARA　　　2,354,701
FUEL TANK FOR AIRPLANES
Filed June 19, 1941　　　5 Sheets-Sheet 4
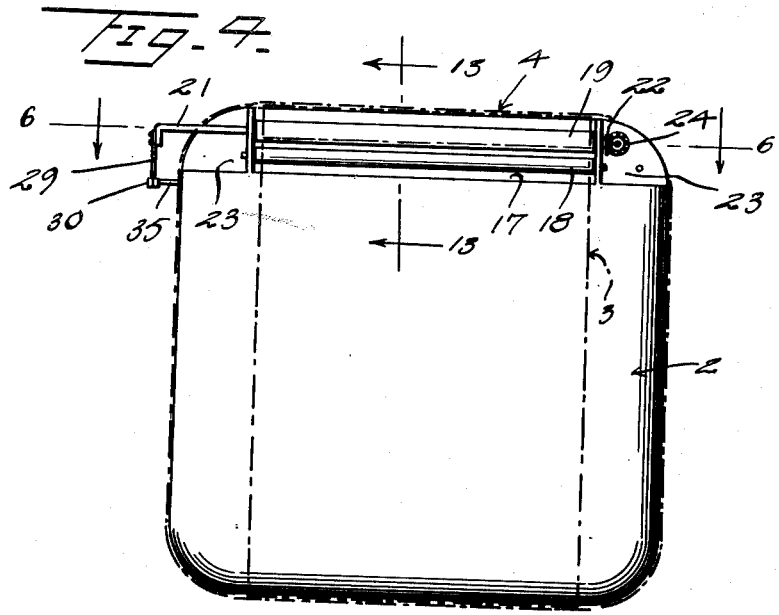
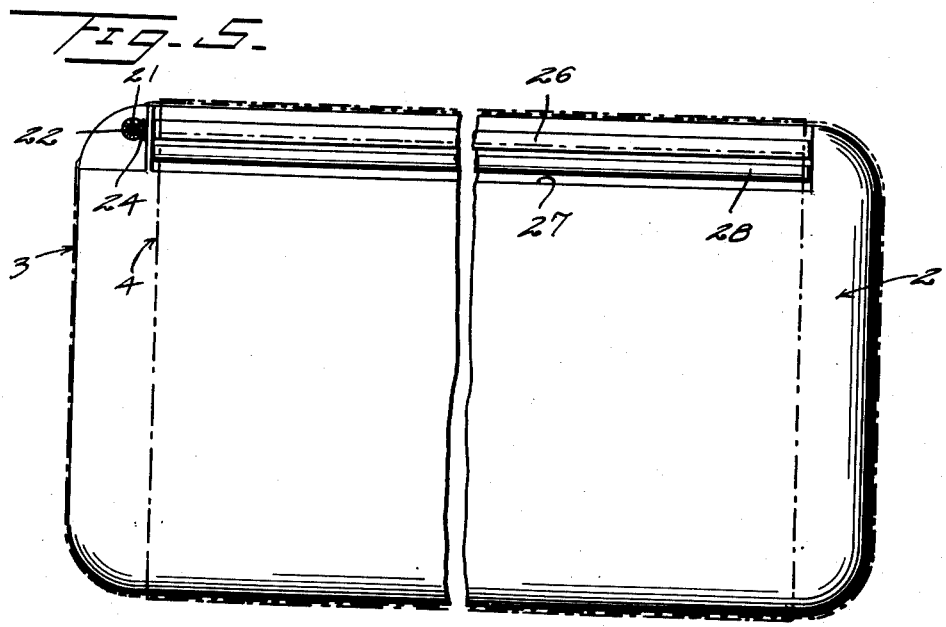
Inventor
Mario G. P. Pescara
By
Attorneys Aug. 1, 1944.   M. G. P. PESCARA   2,354,701
FUEL TANK FOR AIRPLANES
Filed June 19, 1941   5 Sheets-Sheet 5
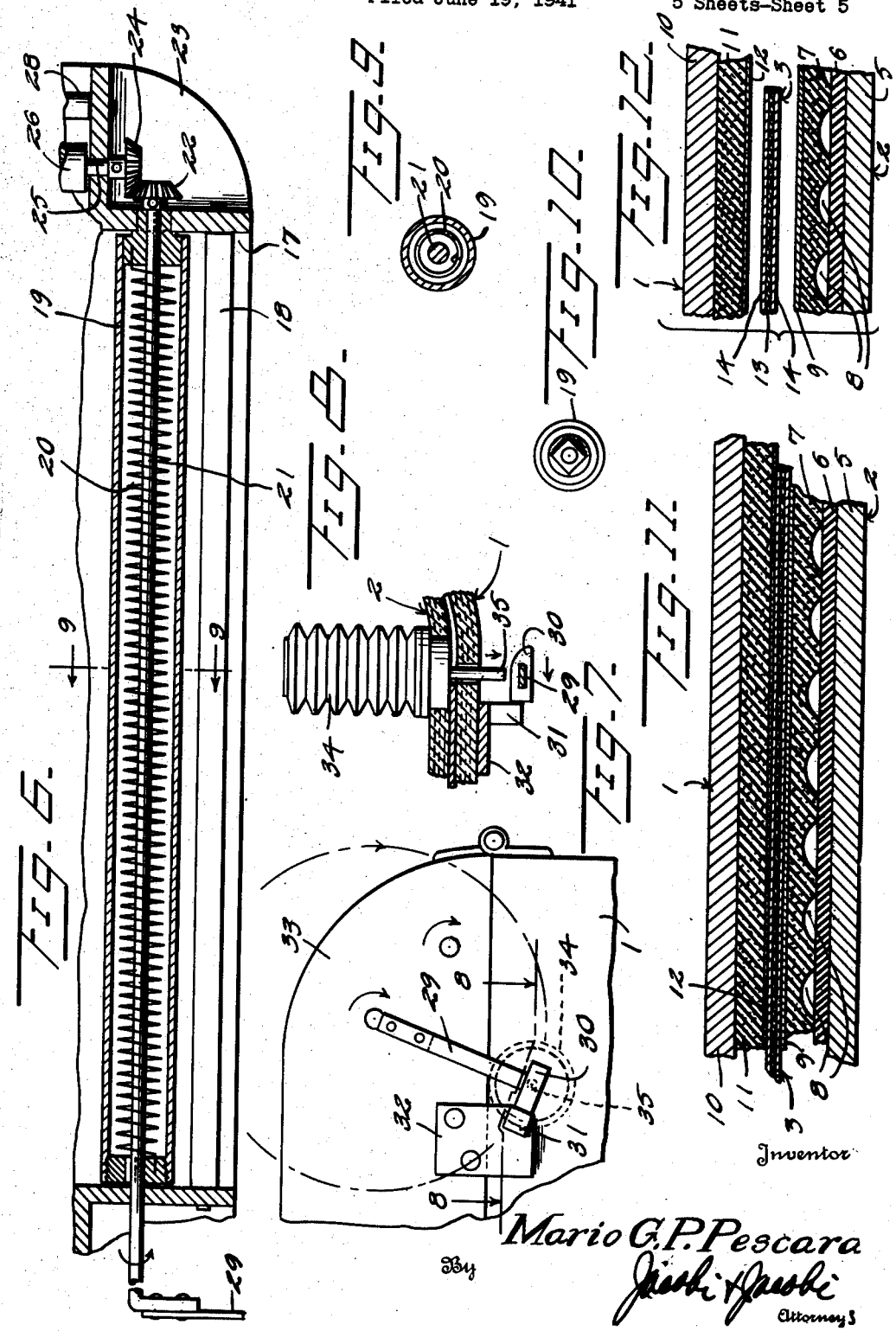
Inventor
Mario G.P.Pescara
By
Attorneys Patented Aug. 1, 1944

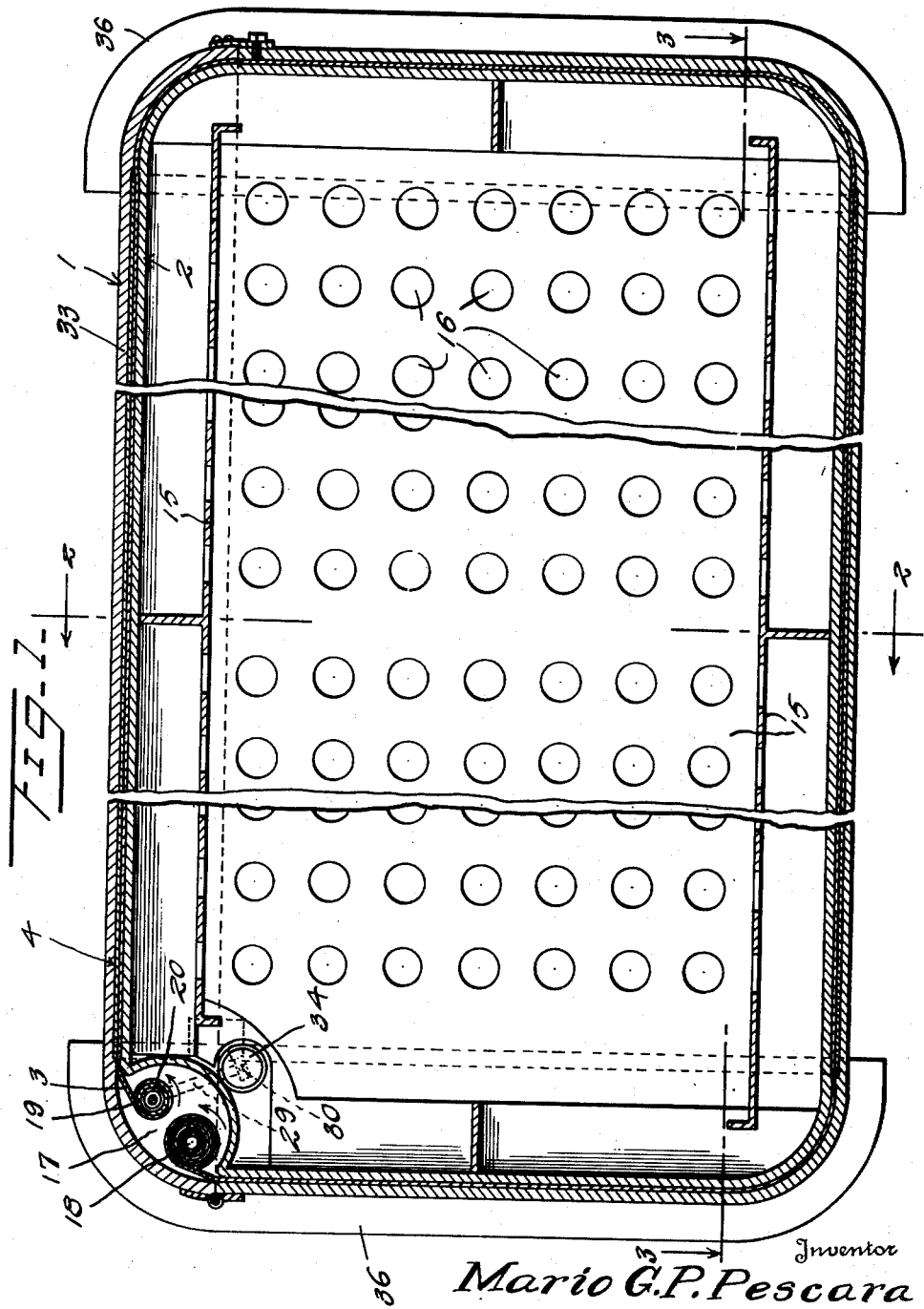

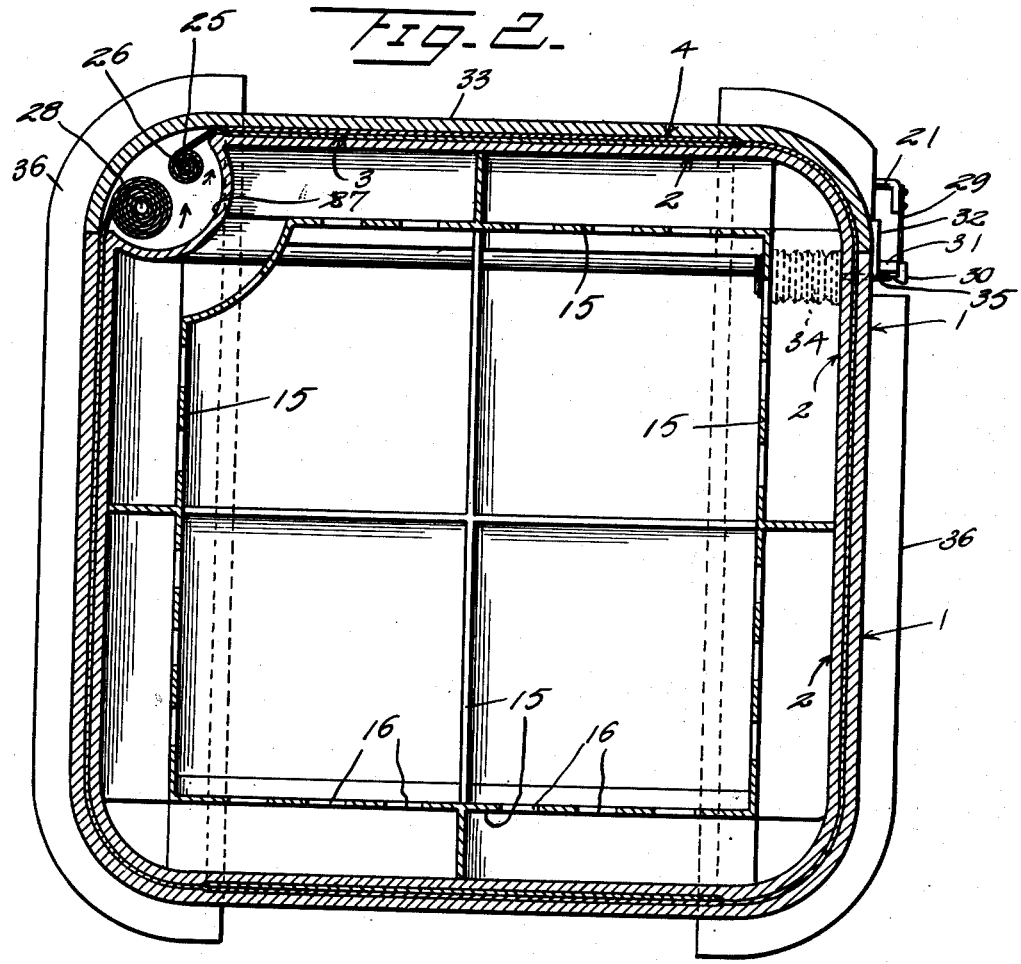
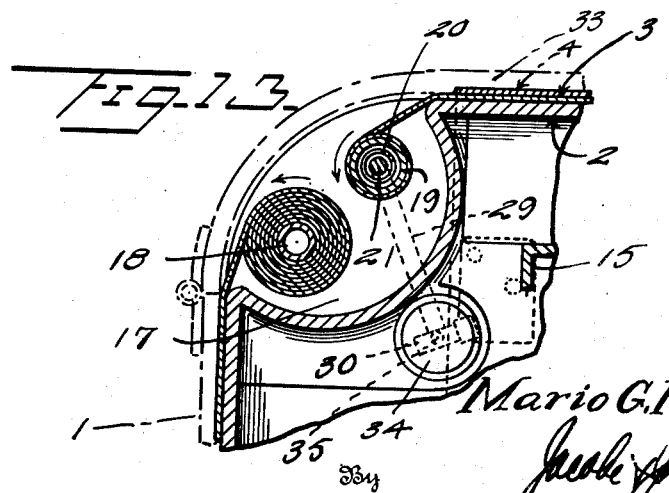

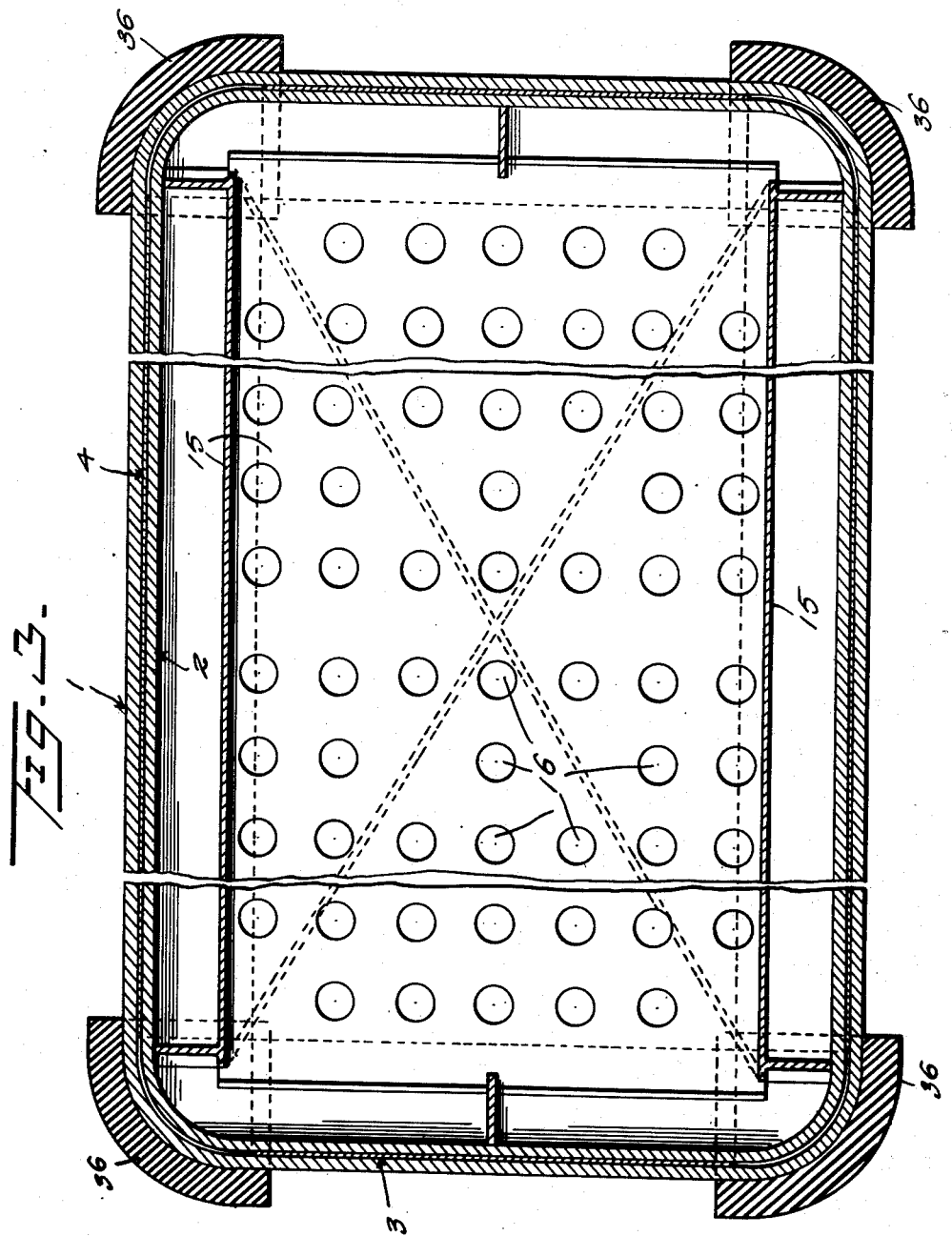

2,354,701

UNITED STATES PATENT OFFICE 2,354,701

FUEL TANK FOR AIRPLANES

Mario G. P. Pescara, Philadelphia, Pa.

Application June 19, 1941, Serial No. 398,845

9 Claims. (Cl. 220—1)

My invention relates to new and useful improvements in fuel tanks and more particularly in fuel tanks for airplanes, the primary object of the invention being to provide a tank which is leakproof, crashproof and one which will be self-sealing when penetrated by a bullet or projectile.

Still another object of the invention resides in the provision of a tank for fuel which is non-metallic, strong but flexible, requiring no riveting or welding in the formation thereof, and one which is substantially vibrationproof.

A further object resides in the provision of a tank formed of stationary and movable elements, the latter being movable from pressure within the tank upon the entry of a bullet or other projectile, whereby openings formed in the tank may become self-sealing.

A still further object resides in forming a tank of inner and outer shells, formed of non-metallic material, semi-rigid but flexible and resistant to heat, between which is adapted to move a thin curtain of strong, flexible material impervious to liquid, whereby holes formed in the shells by penetration of bullets or other projectiles may be automatically sealed to prevent loss of the fuel.

Still another object of the invention resides in the provision of a metallic bellows within the tank, so connected with the movable curtain between the shells thereof as to operate said curtain, or movable element, upon pressure within the tank caused by entry of a bullet or other projectile therewithin.

A still further object of my invention resides in the provision of a fuel tank which is not only provided with a mechanical means for sealing openings formed therein by bullets or projectiles, but which is also constructed with means in the form of particular materials which have self-sealing properties, so that a double self-sealing protection is afforded.

Still another object resides in providing a tank which is comparatively simple and durable in construction, inexpensive to manufacture and one which will be useful for general as well as for military purposes.

With these and numerous other objects in view, my invention consists in the novel features of construction, combination and arrangement of parts as will be hereinafter referred to and more particularly pointed out in the specification and claims.

In the accompanying drawings, forming a part of this application,

Figure 1 is a vertical longitudinal sectional view through a tank constructed in accordance with my invention;

Figure 2 is a vertical transverse section therethrough as seen on the line 2—2 of Figure 1;

Figure 3 is a horizontal sectional view through the tank, as seen on the line 3—3 of Figure 1, looking in the direction of the arrows;

Figure 4 is an end elevation of the inner shell of the tank with the curtains or movable elements removed but shown in dot and dash lines thereon;

Figure 5 is a side elevation of the inner shell of the tank, with the curtains or movable elements removed, but shown in dot and dash lines thereon;

Figure 6 is an enlarged horizontal sectional view as seen on the line 6—6 of Figure 4, looking in the direction of the arrows, showing particularly the power roller for operation of the movable curtains;

Figure 7 is an enlarged fragmentary side elevation of the inner shell, showing the means for retaining the power roller in its normal stationary position;

Figure 8 is a sectional view substantially on the line 8—8 of Figure 7, showing its relation to the power roller;

Figure 9 is a transverse section through the power roller as seen on the line 9—9 of Figure 6;

Figure 10 is an end elevation of one end of the power roller, with the shaft removed;

Figure 11 is an enlarged fragmentary section through the tank, showing the relationship between the inner and outer shells and the movable curtain therebetween;

Figure 12 is a similar view with the stationary and movable elements separated to better illustrate the constituent parts thereof, and Figure 13 is a fragmentary enlarged vertical sectional view through one corner of the inner shell of the tank, illustrating particularly the relationship between the power roller and the feed or wind-off roller and the curtain operating thereon.

One of the greatest difficulties encountered in military aviation is the provision of means to satisfactorily and efficiently protect the fuel tank of an airplane in flight as well as in crashing to the ground. I have invented, as revealed by my Patent No. 1,535,462, issued April 28, 1925, a type of tank which will overcome various difficulties that have been encountered, but in carrying out the invention of said patent it is required that the tank be built cylindrical and, furthermore, the mechanism for operation thereof is more or less complicated. My present invention is an improvement on my former invention, as shown in the patent aforesaid, permitting the tank to be built in any desired shape and requiring no complicated mechanism for its operation.

Various experiments have been made, but it will be found that in the devices proposed there has been nothing presented wherein the tank will be leakproof, self-sealing, crash-proof, vibrationproof, heat-resisting, light and flexible, so that a thoroughly efficient tank may be produced. My improved invention, as hereinbelow described and claimed, meets all of these requirements.

In describing the invention, I shall refer to the drawings in which similar reference characters designate corresponding parts throughout the several views and in which the numeral 1 designates an outer shell, the numeral 2 an inner shell, the numeral 3 a movable curtain operating longitudinally of the tank between said shells, and the numeral 4 an additional movable curtain operating between the shells transversely of the tank. As indicated aforesaid, these shells are stationary whereas the curtains 3 and 4 are adapted to move between the shells to seal openings which may be formed therein, by reason of the penetration of bullets or other projectiles. The operation of the movable elements will be more particularly and hereinafter set forth.

The shells are more or less box-like, although the same may be of any desired shape and size. As shown, they are substantially rectangular with rounded corners. The inner shell 2, as best illustrated in Figures 11 and 12, is constituted of a base element or lamination of thin fibrous or plastic material which is semi-rigid, flexible, tough and heat-resisting. This lamination, being directly in contact with the contents of the fuel tank, is, of course, impervious to any chemical action of the fuel within the tank and is liquidproof. This inner lamination is designated specifically by the numeral 5 and vulcanized to the outer face of said lamination is a solid rubber or synthetic rubber layer 6. Similarly vulcanized to the outer face of the lamination 6 is a layer of sponge rubber 7 or solid latex, the inner face of which is provided with a plurality of concaved recesses 8. These recesses 8 tend to reduce the weight of the shell and at the same time aid in the yielding quality of the lamination. The outermost face of the sponge rubber or solid latex layer 7 is provided with a thin glazed coating 9 to provide a smooth surface thereon against which the movable element abuts and over which said movable element may readily slide when necessary.

The outer shell which generally conforms in its contour to the inner shell is composed of an outer or base lamination 10 formed of the same material as is the lamination 5 of the inner shell, having vulcanized to the inner face thereof a layer or lamination 11 of sponge rubber or solid latex, the same as the lamination 7 on the inner shell, except that no recesses are formed on the face of said lamination 11 abutting the lamination 10. The innermost face of the sponge rubber lamination 11 is also coated with the glazed material 12 which is the same as the glaze coating 9 on the inner shell.

As stated heretofore, these shells are stationary and between the same is compressed and adapted to slide, under certain circumstances, a curtain. This curtain 4 is composed of an inner member or core formed of a plastic composition, very light and flexible, such as "Vynelite," although some other similar and suitable material may be used. The essential characteristics of this core, which, for convenience, is designated by the numeral 13, are that the same is thin, tough and flexible. Both faces of this core 13 of the curtain are treated or coated with a plastic material, the coating being designated by the numeral 14. This coating gives semi-rigidity to the curtain, although the same normally retains flexibility to enable the same to be wound on rollers, as will be hereinafter and more particularly set forth.

It may be here stated that the elements of the shell and the curtain are greatly exaggerated in Figures 11 and 12 of the drawings for clarification. In actual use, each shell and the curtain are very limited in thickness and the thickness of the tank, including both shells and the curtain, would approximate possibly one-half to five-eighths of an inch. The shells are fitted closely together to bind tightly against the curtain therebetween. The resilience of the sponge rubber laminations permits this to be accomplished and the glaze coating on the opposed faces of the sponge rubber lamination obviously permit the curtain to be drawn readily between the shells when necessary. It is apparent that the shells and the curtain are compactly arranged, so that in the event of a puncture, caused by the penetration of a bullet or projectile through the tank, the curtain will be drawn to a position whereby the opening therein will be out of registration with the openings in the shells. Thus, the openings in said shells will be sealed. This will prove to be a self-sealing feature, as will be hereinafter and more particularly set forth.

The inner shell 2 is provided with a plurality of vertical and horizontal intersecting partition walls 15 which are perforated, as shown at 16. Obviously these partition walls assist in retaining the inner shell in rigid position and the same also will break the shock caused by displacement of fuel in the tank, particularly while the plane carrying this tank is maneuvering and in landing. These partition walls may be held in place in any desired or suitable manner.

The inner shell 2 at the junction of the top and one end wall, as shown in Figures 1, 4 and 13 of the drawings, is recessed for the greater portion of its length as shown at 17 and the end walls of this recess form bearings for rollers 18 and 19. One end of the curtain 3, which operates longitudinally of the tank, is connected with the roller 19 and after passing between the top portions of the shells, between the ends and bottom thereof, is connected with the roller 18. As a matter of fact, the roller 18 constitutes the feed roller, the greater portion of the curtain being wound thereon. The roller 19 is the power roller, being constructed hollow with an internal power spring 20 therein. The power spring operates in connection with a shaft 21, which projects through one end wall of the recess 17 and has a pinion 22 carried thereon. The end of the inner shell outside of the end walls of the recess 17 are cut away to form pockets 23, as clearly shown in Figures 4 and 6 of the drawings. The one pocket forms a recess for the pinion 22 which also meshes with an additional pinion 24 carried on a shaft 25 extending in a plane at right angles to the shaft 21. This shaft 25 carrying the roller 26 thereon extends longitudinally of the shell 2 in a recess 27 formed at the junction of the top and one side wall, as clearly shown in Figures 2 and 5 of the drawings. Also, rotatably mounted in the walls of this recess 27 is a feed roller 28. The aforesaid curtain 4, rolled on the roller 28 extends between the shells operating transversely of the tank, that is, extending over the sides, bottom and top of the inner shell, the same projecting over the outside of the other curtain 3 at the top and bottom of the tank, as clearly shown in Figures 1 and 2. The roller 19 being a power roller conneced with the shaft 26 through the pinions 22 and 23, will, when operated, cause the curtains 3 and 4 to be respectively unwound from the rollers 18 and 28 and in turn wound upon the rollers 19 and 26.

The end of the shaft 21 opposite that carrying the pinion 22 thereon, has the spring arm 29 connected therewith. The outer end of the spring arm 29 has an enlargement 30 connected therewith which is adapted to abut an outstanding projection or stud 31 carried on the plate 32. This plate is riveted or otherwise secured to the outer face of the hinged top 33 of the outer shell 1, as best illustrated in Figure 7 of the drawings. The hinged top 33 of the outer shell may be secured in any desired manner when the tank is in use and affords means when the top is opened to assemble the tank and fill the same.

Mounted within the inner shell at a point immediately adjacent the recess 17 is a metallic bellows 34, normally expanded and provided with an extension pin 35 which projects through the inner and outer shells 1 and 2, as shown in Figure 8 of the drawings. In normal position, as shown in Figure 8, with the bellows 34 expanded, the end of the pin 35, while in alinement with the projection or enlargement 30 of the spring arm 29, is inward of the latter. When pressure is exerted within the inner shell, as, for instance, upon the penetration therethrough of a bullet or other projectile, the bellows 34 will be compressed so that the pin 35 thereof will be projected outwardly into contact with the enlargement 30 on the spring arm 29. Upon such action, the spring arm, forced outwardly, will carry with it the enlargement 30 beyond the stop or lug 31 and the spring 20 within the roller 19 will cause the latter to rotate one revolution, withdrawing the curtain 3 from the roller 18 and simultaneously withdrawing the curtain 4 from the roller 28. Under such action, the curtains 3 and 4 will be drawn through the shells and the portions withdrawn will be wound, respectively, upon the rollers 19 and 26. Thus, if a hole is formed in the shells by the penetration therethrough of a bullet or projectile, these curtains will be instantly caused to operate and immediately cause to seal the openings in the shells. In other words, the opening which may be formed by such penetration of bullet or projectile through the curtains will be moved out of registration with the openings formed in the shells. This action of the movable curtains, together with the spongy condition of the laminations 7 and 11, will obviously seal the openings to prevent leakage of the fuel from the tank.

As shown in Figure 3 of the drawings, corner portions of the tank formed by these shells are unprotected insofar as the sealing curtains are concerned. To overcome this condition, I provide the protecting elements 36, applied to the outer faces of the outer shell. These protecting elements may be self-sealing rubber, armor plating, or any other desired material which may be used to accomplish the desired result.

It will be seen that the tank hereabove described is so constructed that it may be mounted in an airplane or other structure from points on said tank which will not conflict or interfere with the free and efficient movement of the movable elements of the device.

It will be seen that the combination of elements as above described produces a fuel tank having very definite advantages over those now in use or known. My improved tank is leakproof, regardless of shape or size and is exceedingly light in weight. It has double leakproof or self-sealing protection, with no complicated mechanism being involved for the effective operation of the movable parts. It is built substantially in its entirety of non-metallic materials, without joints, rivets or welding and is vibration-proof and relatively crashproof.

From the foregoing description of the construction of my improved fuel tank, the method of assembly and the operation thereof will be readily understood and it will be seen that I have provided a simple, inexpensive and efficient means for carrying out the various and numerous objects of the invention.

While I have particularly described the elements best adapted to perform the functions set forth, it is obvious that various changes in form, proportion and in the minor details of construction may be resorted to without departing from the spirit or sacrificing any of the principles of the invention.

Having thus described my invention, what I claim is:

1. In a fuel tank for airplanes and the like, inner and outer shells in slightly spaced relation one to the other, and a pair of film-like flexible elements interposed between said shells and in sliding contact with the inner opposed faces thereof, one of said sliding flexible elements being adapted to operate transversely and the other longitudinally of said shells with portions of the flexible elements extending transversely across each other in face to face engagement and providing sealing means of double thickness.

2. In a fuel tank for airplanes and the like, inner and outer shells in slightly spaced relation one to the other, a pair of film-like flexible elements interposed between said shells and in sliding contact with the inner opposed faces thereof, said elements operating respectively transversely and longitudinally of said shells with portions extending transversely across each other and in face to face engagement with each other to provide double thickness and means cooperating with said elements and the interior of the inner shell to slide said elements with respect to said shells upon the development of pressures within said inner shell.

3. In a fuel tank for airplanes and the like, an outer shell, an inner shell slightly spaced therefrom, a pair of curtains each formed of film-like flexible material impervious to fluids and interposed between said shells, one of said curtains being movable longitudinally of said shells and extending circumferentially about the tank longitudinally thereof along the top and the bottom and the end walls of the tank and the other of said curtains being movable transversely thereof and extending circumferentially about the tank transversely thereof and across portions of the first curtain at the top and bottom of the tank to provide double thicknesses of curtain material for the top and the bottom of the tank, a pair of rollers mounted in said outer shell connected respectively with the ends of one of said curtains, an additional pair of rollers mounted in said outer shell in a plane at right angles to the plane of the first mentioned rollers and having connection respectively with the ends of the other curtain, means connecting one roller of each pair of rollers whereby said curtains may be actuated simultaneously, and means within the inner shell having connection with one of the rollers of one pair of rollers for rotating the latter a predetermined degree, and correspondingly sliding both curtains between the shells, upon development of certain pressures within said inner shell.

4. In a fuel storage device, a container having inner and outer walls, a curtain for sealing punctures in said walls extending between the walls in flat face to face engagement therewith and shiftable longitudinally to move an unpunctured portion of the curtain across punctures in the walls in closing relation thereto, rollers rotatably mounted and having end portions of said curtain wound thereon, a shaft for one curtain having an arm extending laterally therefrom, an abutment for engagement by said arm to limit rotation of the shaft and movement of the curtain during rotation of the rollers, and a pressure actuated device in said container having a stem projecting externally of the container in position for engaging said arm and temporarily shifting the arm out of engagement with said abutment to permit rotation of the rollers and movement of the curtain.

5. In a fuel storage device, a container having walls, a curtain for sealing punctures in said walls, rollers having end portions of said curtain wound thereon, a shaft for one curtain having an end portion projecting externally of said container and provided with a laterally extending resilient arm, a spring for rotating said roller and winding the curtain thereon when said arm is released, an abutment mounted externally of said container in position for engagement by said arm to limit rotation of the roller, and pressure actuated means in said container having a stem externally of the container in position for engaging said arm and temporarily flexing the arm out of engagement with said abutment to permit rotation of the roller and shifting an unperforated portion of the curtain into closing relation to the perforation formed in a wall of the container.

6. In a fuel storage device, a container having walls, a curtain for sealing punctures in said walls, rollers having end portions of said curtain wound thereon, a shaft for one curtain having an end portion projecting externally of said container and provided with a laterally extending resilient arm, a spring for rotating said roller and winding the curtain thereon when said arm is released, an abutment mounted externally of said container in position for engagement by said arm to limit rotation of the roller, a cylinder in said container having walls of crimped resilient metal, a pin carried by said cylinder and projecting out of said container back of said arm and adapted to engage the arm and flex the arm outwardly out of engagement with said abutment when abnormal pressure in the container temporarily collapses the cylinder and forces the stem outwardly, said stem being subsequently retracted for return of the arm into position to engage the abutment and stop rotation of the rollers after the curtain has been shifted longitudinally and an unperforated portion of the curtain moved into closing relation to a puncture formed in a wall of the container.

7. In a fuel storage device, a container having inner and outer walls, a curtain between said walls shiftable longitudinally to move an unperforated portion of the curtain into closing relation to punctures formed through the walls, a portion of the inner wall being offset inwardly to form a chamber, rollers rotatably mounted in said chamber and having end portions of said curtain wound thereon, one roller having a shaft projecting outwardly from an end of the chamber and having a laterally extending arm including a resilient terminal portion formed with a cross head at its end, an abutment carried by said container externally thereof in position for engagement by the cross head to limit rotation of said roller, a spring for rotating said roller and shifting the curtain longitudinally when the cross head is out of engagement with the abutment, and a pressure actuated member in said container including a stem projecting outwardly from the container in position to engage the resilient portion of said arm and flex the same outwardly and dislodge the head from engagement with the abutment.

8. In a fuel storage device, a container having inner and outer walls, a curtain between said walls shiftable longitudinally to move an unperforated portion of the curtain into closing relation to punctures formed through the walls, a portion of the inner wall being offset inwardly to form a chamber, rollers rotatably mounted in said chamber and having end portions of said curtain wound thereon, one roller having a shaft projecting outwardly from an end of the chamber and having a laterally extending arm at its outer end, an abutment for engagement by said arm to limit rotation of the shaft and said roller and stop movement of the curtain after a puncture has been closed and pressure actuated means in said container at one end of said chamber including a stem projecting out of the container in position to shift the arm out of engagement with the abutment and permit rotation of the roller and movement of the curtain when the pressure device is actuated by abnormal pressure in the container.

9. In a fuel tank for airplanes and the like, inner and outer shells each having a main lamination of fibrous plastic material, confronting faces of the laminations being coated with layers of soft rubber adhesively vulcanized thereto, confronting faces of the rubber layers being spaced from each other and glazed to form smooth surfaces, curtains of impervious plastic material extending through spaces between the coated faces of said rubber layers, said curtains extending about the tank transversely of each other with portions disposed in crossed face to face engagement with each other to provide double thicknesses, and means for shifting the curtains longitudinally when the tank is perforated and moving unperforated portions of the curtains into position to seal the perforations.

MARIO G. P. PESCARA.